(No Model.)
J. T. LALLY.
ANIMAL RELEASING DEVICE.
No. 579,113.  Patented Mar. 16, 1897.
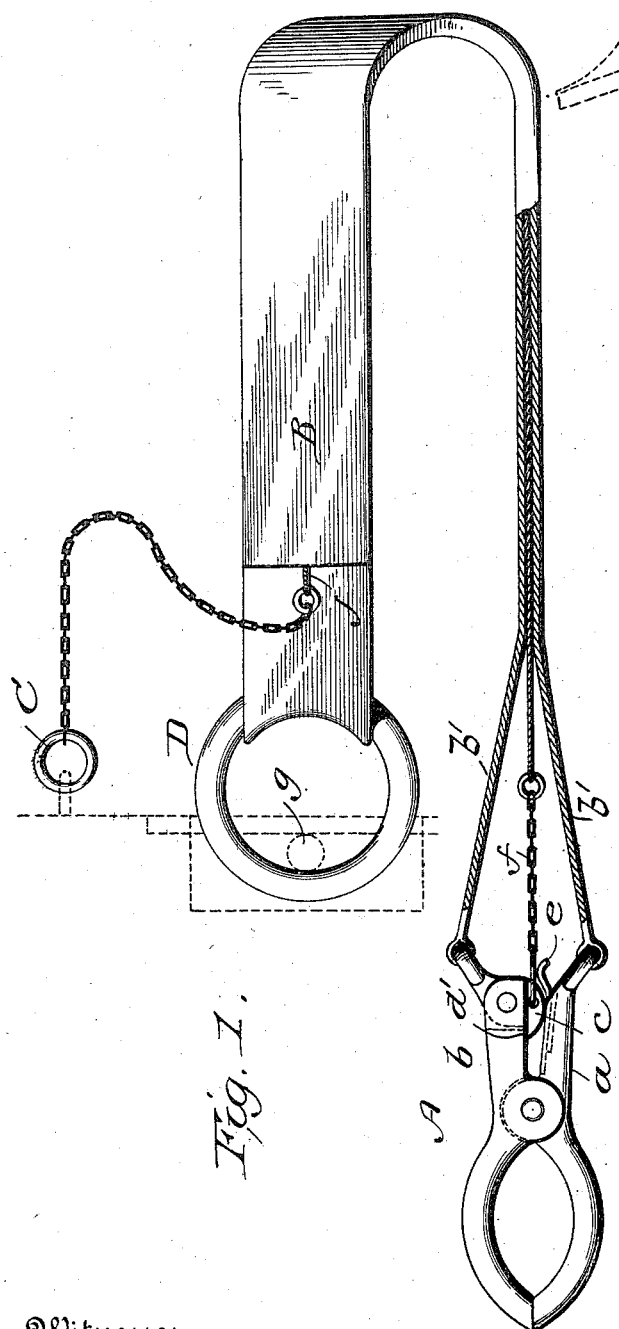
Inventor
John T. Lally,
By F. Benjamin
His Attorney

UNITED STATES PATENT OFFICE.

JOHN T. LALLY, OF WILMINGTON, DELAWARE, ASSIGNOR TO JOHN H. CLAY, OF PHILADELPHIA, PENNSYLVANIA.

ANIMAL-RELEASING DEVICE.

SPECIFICATION forming part of Letters Patent No. 579,113, dated March 16, 1897.

Application filed October 22, 1896. Serial No. 609,696. (No model.)

*To all whom it may concern:*

Be it known that I, JOHN T. LALLY, a citizen of the United States, residing at Wilmington, in the county of New Castle and State of Delaware, have invented certain new and useful Improvements in Animal-Releasing Devices; and I do hereby declare the following to be a full, clear, and exact description of the invention, such as will enable others skilled in the art to which it appertains to make and use the same.

My invention relates to improvements in devices for quickly releasing animals from stalls or from vehicles, and it is especially adapted for use in connection with animal-releasing systems commonly used in city fire-departments where the opening of the stall-door automatically releases the hitching-strap by which the horse is secured in the stall. The straps generally in use in such systems are released from a ring in the stall and are carried by the horses and are sometimes lost. My invention provides for releasing the strap from the halter.

My invention is also applicable to traces, so that the horses may be released promptly from the vehicles to which they are harnessed, as will fully appear in the following description and in the accompanying drawings, in which—

Figure 1 represents my invention as applied to a halter. Fig. 2 represents it on a smaller scale as applied to a harness-trace, and Fig. 3 is a detail of the snap-hook which I employ.

Like reference-letters indicate like parts in the several views.

In the drawings, A represents a snap-hook formed of jaws $a$ and $b$, pivoted on each other at $a'$. Pivoted at $c'$ to the rear portion of the jaw $b$ is a lever $c$, having a cam-shaped head $d$, in which is a small hole $f'$, and at the other end a ring $c''$. The cam-head of the lever $c$ is held against the shoulder $d'$ of the jaw $b$ when the hook is in a closed position by means of the small curved spring $e$, one end of which is secured to the jaw $a$. Secured in the hole $f'$ in the cam-lever $c$ is one end of a wire cable $f$, which extends through a suitable opening between the two leaves of the strap B and terminates in a ring C, which is suitably secured to a portion of the stall, the said opening being sufficiently large to permit the free play or movement of the cable $f$. The halter or hitching-strap B is composed of the leaves $b'$ $b'$, which are secured, respectively, to the rings $a'$ and $c''$ of the jaws $a$ and $b$ and at their opposite ends in the ring D, which is secured to the stall in any suitable manner, all of which is fully shown in Fig. 1. In said Fig. 1 I have shown the ring D secured to the stall by a bolt or hook $g$, the latter being shown in dotted lines. The manner of securing said ring is no part of my invention, but for the purposes of operating my device it is necessary that provision should be made for automatically or otherwise releasing said ring, and this may be done in any of the well-known ways.

Fig. 2 shows my device in connection with a trace, one end of which is secured to the whiffletree E and the opposite end by means of the hook A to the hame F. The ring C is allowed to hang loosely or may be secured to the dashboard of the vehicle. If it be desired to release the animal from the vehicle, the driver grasps the ring C and pulls on the cable $f$, overcoming the normal pressure of the spring $e$ on the head of the lever $c$ and throwing the latter back, so the rear ends of the jaws $a$ $b$ may come together and their forward ends open and leave the hame F.

The operation of the invention when used with a halter is as follows: When the ring D has been released from the stall, the animal in his efforts to get out will pull directly on the wire cable $f$, which will result in depressing the lever $c$, so that it will pass the shoulder $d$ or be released therefrom, and the strain will then come on the forward ends of the jaws $a$ and $b$, causing them to open and release the halter to which they have been secured.

Having thus described my invention, what I claim as new, and desire to secure by Letters Patent, is—

1. An animal-releasing device consisting of a snap-hook the jaws of which are normally held together by a lever and a spring, said lever, a strap secured to one of said jaws, a wire passing between the leaves of said strap and secured to said lever, and a spring adapted to hold the lever in position, substantially in the manner and for the purposes described.

2. An animal-releasing device consisting of a snap-hook having jaws pivoted together, a lever pivoted in one of said jaws, a spring secured in the other jaw and adapted to hold said lever in its normal position, a wire secured to said lever and adapted to release it from its normal position, and means for securing the hook to a stall or other fixture, substantially as described.

3. In an animal-releasing device the combination with a hook having pivoted jaws, of a lever placed between said jaws and held in normal position by a spring secured to one of said jaws, means for releasing said lever consisting of a wire or other cable one end of which is secured to said lever and the opposite end secured to a stall or other fixture so that when strain is placed on said cable the lever will be drawn from its normal position, substantially as set forth.

4. In an animal-releasing device the combination with a hook composed of jaws pivoted together of a cam-lever placed between the rear portion of said jaws, a spring holding said lever in normal position, a strap composed of two leaves one of which is secured to the lever and the other to one of the jaws of the hook, and a wire or other cable secured to the lever and adapted to draw it from its normal position in the manner and for the purposes described.

In testimony whereof I have signed this specification in the presence of two subscribing witnesses.

JOHN T. LALLY.

Witnesses:
JOSEPH T. LALLY,
THOMAS R. LALLY.